July 16, 1963  H. S. LENHART  3,097,889
DIVERTING VALVE FOR FLUIDIZING GRAVITY CONVEYOR
Filed Nov. 4, 1960  4 Sheets-Sheet 1
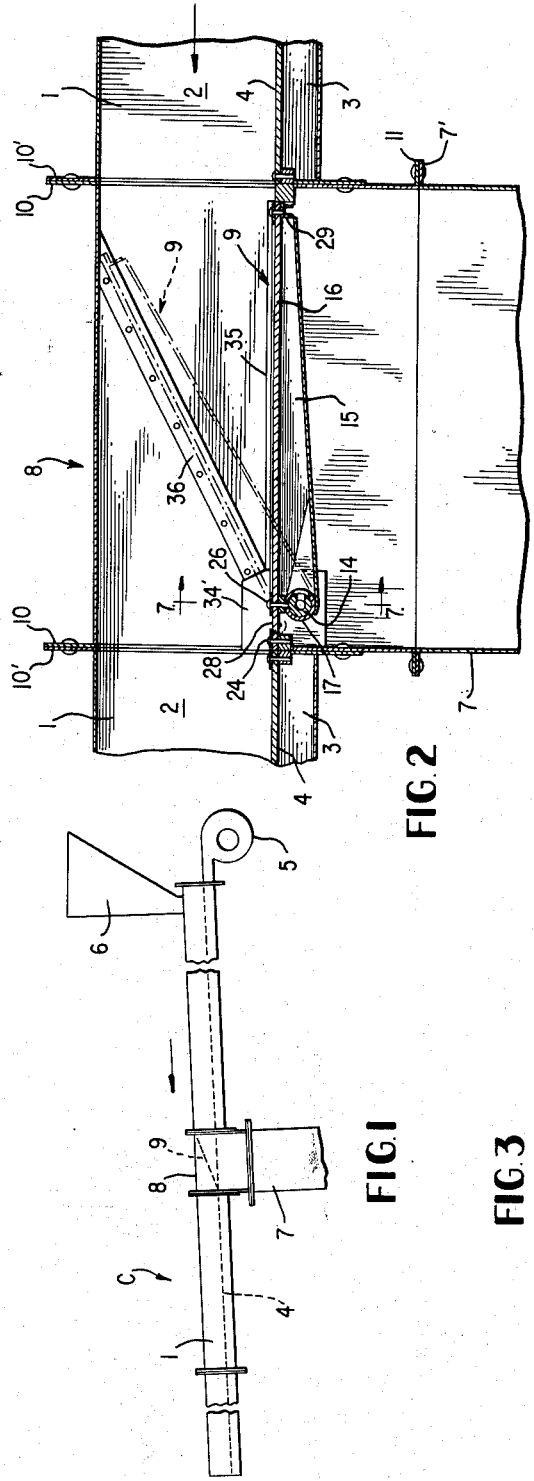
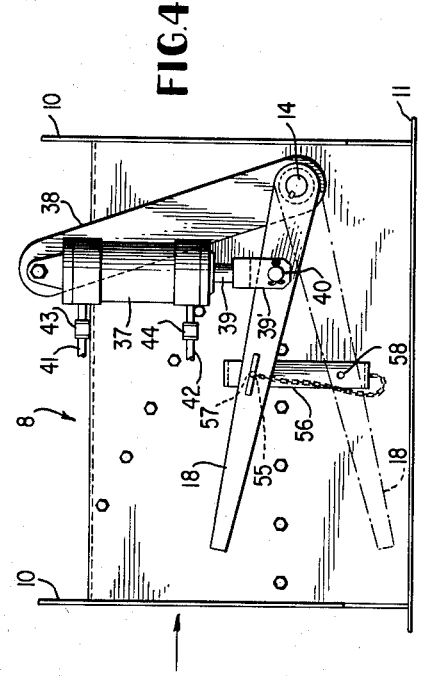
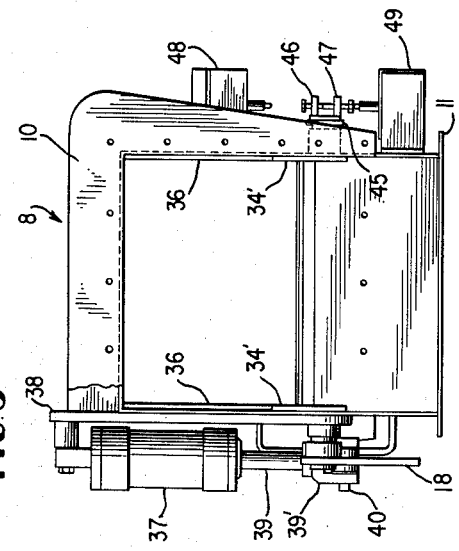
INVENTOR
HERBERT S. LENHART
BY
ATTORNEYS July 16, 1963
H. S. LENHART
3,097,889
DIVERTING VALVE FOR FLUIDIZING GRAVITY CONVEYOR
Filed Nov. 4, 1960
4 Sheets-Sheet 2
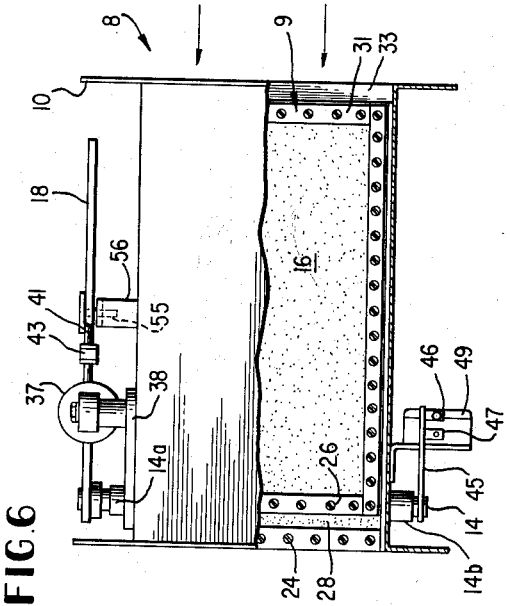
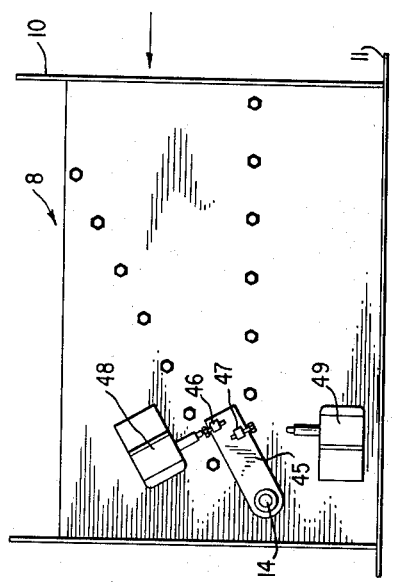
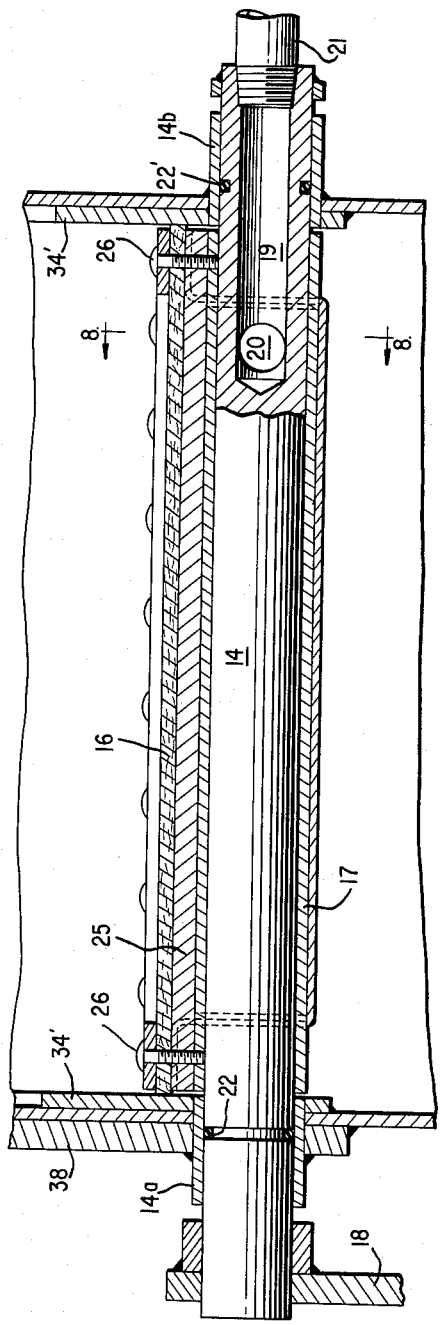
INVENTOR
HERBERT S. LENHART
BY *Pennie Edmonds Morton Barrows & Taylor*
ATTORNEYS July 16, 1963 H. S. LENHART 3,097,889
DIVERTING VALVE FOR FLUIDIZING GRAVITY CONVEYOR
Filed Nov. 4, 1960 4 Sheets-Sheet 3
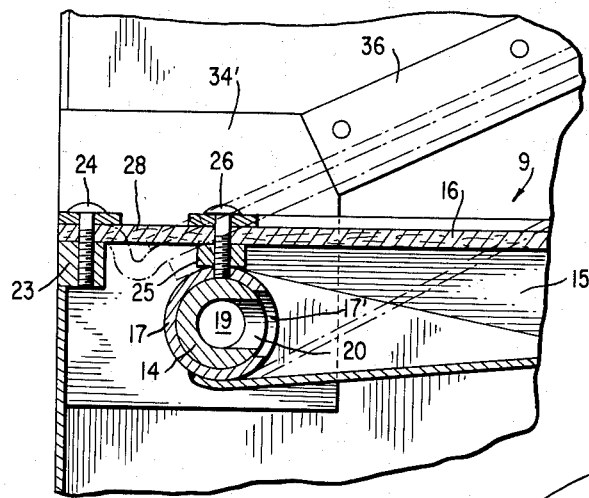
FIG. 8
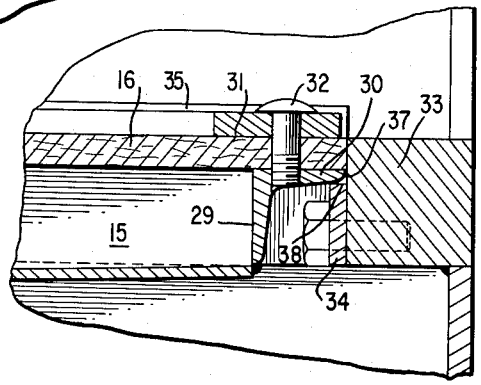
FIG. 9
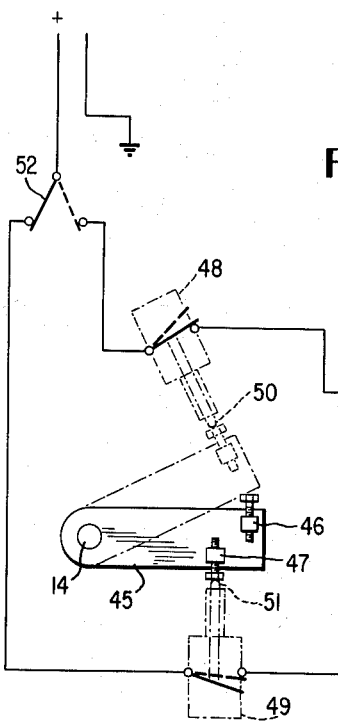
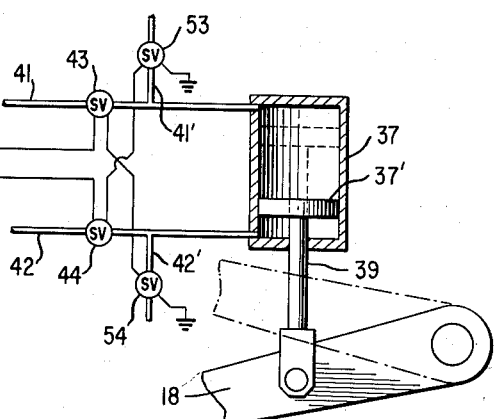
FIG. 10
INVENTOR
HERBERT S. LENHART
BY
ATTORNEYS

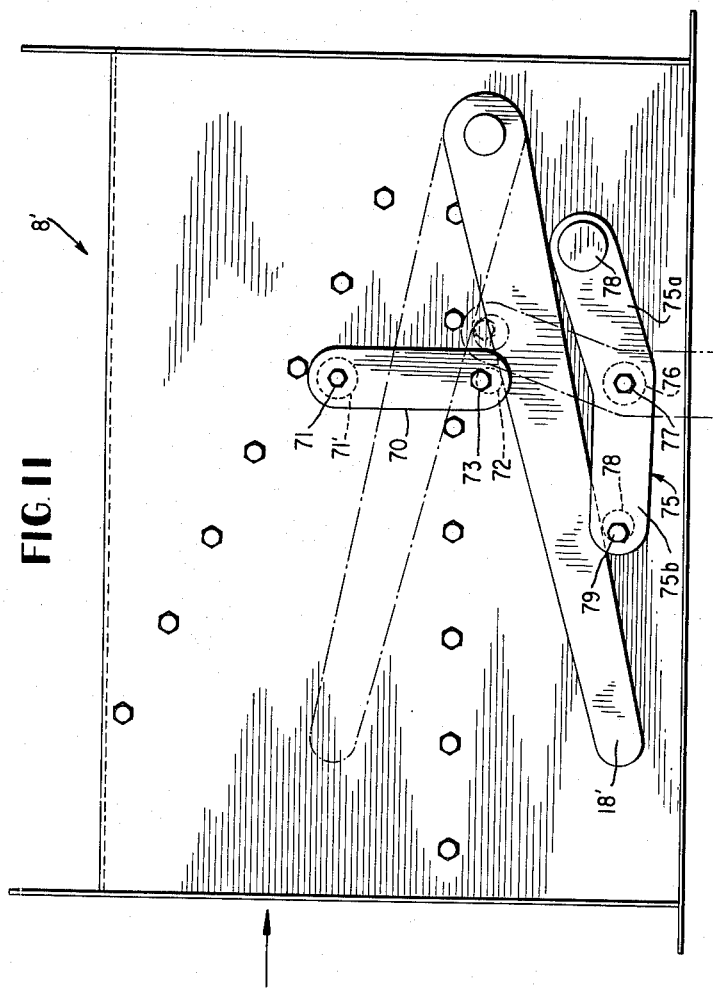
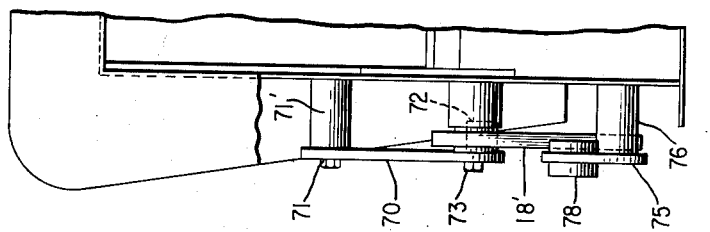
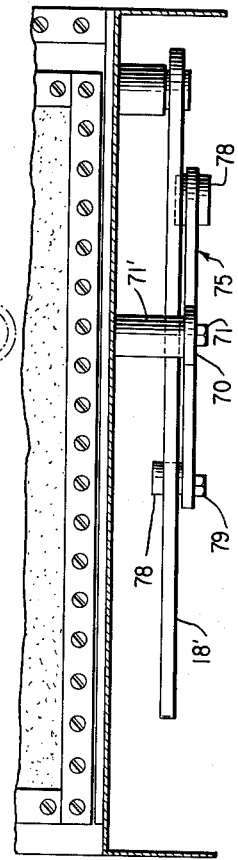
INVENTOR
HERBERT S. LENHART
BY
ATTORNEYS

# United States Patent Office 3,097,889
Patented July 16, 1963

3,097,889
DIVERTING VALVE FOR FLUIDIZING
GRAVITY CONVEYOR
Herbert S. Lenhart, Allentown, Pa., assignor to
Fuller Company, a corporation of Delaware
Filed Nov. 4, 1960, Ser. No. 67,251
15 Claims. (Cl. 302—29)

The present invention relates to a fluidizing gravity conveyor for pulverulent material of the type having a conveying surface of gas-permeable material through which gas is passed from an underlying plenum chamber into the overlying pulverulent material to fluidize the material so that it will flow by gravity downwardly along the gas-permeable surface, and particularly to such a conveyor having a separate or special section including a part which normally forms a section of the conveyor surface, but which is movable from the plane of the conveyor surface to permit material flowing along the conveying surface to be diverted into a vertically-extending offtake conduit.

The patent to Browne and Hillman No. 2,157,837 discloses a fluidizing gravity conveyor for pulverulent material of the above type having a portion of its conveying surface and underlying plenum chamber formed as a separate section which, when it is desired to divert fluidized material flowing along the conveyor surface into a vertical offtake conduit, may be lifted from its normal position in planar alignment with adjacent sections of the conveyor to provide an opening or gap in the conveying surface through which the material may fall or flow into a vertical offtake conduit.

The present invention has as its primary purpose the provision of a fluidizing gravity conveyor of the general type of that disclosed in the foresaid patent, but in which the separate diverting section which is movable from the plane of the conveyor surface is a valve member hinged adjacent to its downstream end on a horizontal axis extending transversely of the direction of flow of material along the conveyor. The diverting valve may be swung about its pivotal axis to a raised position to provide an opening or gap in the conveying surface through which material flowing along the conveyor may flow or fall into a vertical offtake conduit, in the same manner as in the foresaid patent.

Suitable means are provided for introducing air or other gas into the plenum chamber of the hinged section of the conveyor so that when the separate section is in its normal position it functions similarly to the other sections of the conveyor. Preferably the air or other gas is introduced into the plenum chamber through the hinged pintle. The swinging of the separate section may be controlled manually, as by a hand-operated lever, or it may be remotely controlled through a fluid-actuated cylinder or by electrically-actuated means such as solenoids or the like.

The invention will be further described in connection with the accompanying drawings, in which:

FIG. 1 is a diagrammatic side elevational view of a portion of a fluidizing gravity conveyor including the diverting section of the invention and a vertical offtake conduit;

FIG. 2 is a vertical, longitudinal, sectional view, on an enlarged scale, through the diverting section and showing portions of adjacent sections of the conveyor and an attached offtake conduit, with the diverting valve shown in full lines in its normal position and in dotted lines when swung in a position to permit material to be diverted into the offtake conduit;

FIG. 3 is an end view of the diverting section of FIG. 2;

FIG. 4 is a side elevational view looking from the left of FIG. 3, showing the means for actuating the pivoted conveying surface and plenum chamber of the diverting section;

FIG. 5 is a side elevational view looking from the right of FIG. 3;

FIG. 6 is a plan view, partly in section, of the diverting section;

FIG. 7 is a sectional view, on an enlarged scale, taken on line 7—7 of FIG. 2;

FIG. 8 is a sectional view, on an enlarged scale, taken on line 8—8 of FIG. 7;

FIG. 9 is a vertical sectional view, on an enlarged scale, showing how the distal end of the diverting valve is supported when in its conveying position;

FIG. 10 is a diagrammatic view showing the means for actuating the diverting valve;

FIG. 11 is a side elevational view of a modified form of diverting section showing manual means for swinging the diverting valve about its pivotal axis;

FIG. 12 is a partial end view ofthe diverting section of FIG. 11, with parts broken away; and FIG. 13 is a partial plan view of the diverting section of FIG. 11.

Referring to the drawings, and first to the embodiment of the invention shown in FIGS. 1 to 10, the fluidizing gravity conveyor C is of the general type disclosed in the patent to Schemm No. 2,527,455. It includes a plurality of sections 1 connected together in end-to-end relationship. Each section comprises an upper compartment 2 through which the material is conveyed and a lower compartment 3. The two compartments are separated by a gas-permeable partition or deck 4 which functions as the conveying surface of the conveyor. The gas-permeable deck preferably is a closely-woven, heavy textile material, similar to material used for canvas belting. The compartment 3 forms a plenum chamber which receives air from a blower 5. The conveyor is mounted to have a slight downward inclination. A hopper 6 for supplying pulverulent material to the conveyor communicates with the upper end of the conveyor. In operation, material is fed from the hopper 6 onto the upper end of the gas-permeable conveying deck 4 and is fluidized by air passing from the plenum chamber 3 upwardly through the deck. The fluidized material flows downwardly along the conveying surface and is discharged from the lower end of the conveyor.

Interposed midway along the conveyor and directly over a vertical offtake conduit 7 is a separate or special diverting section 8 including the diverting valve 9 of the present invention.

The ends of the diverting section 8 are provided with outwardly-extending flanges 10 which are connected by bolts or rivets to corresponding flanges 10' on the adjacent sections of the conveyor. The lower side of the section is provided with a horizontally-extending flange 11 which is riveted or bolted to the flanged upper end 7' of the vertical offtake conduit 7.

The diverting valve 9 is pivoted on a horizontal axis on pintle 14 extending transversely across the diverting section adjacent to the downstream end thereof. The pintle 14 is journaled in bearing sleeves 14ª and 14ᵇ rigidly mounted in opposite side walls of the diverting section. A sleeve 17 is nonrotatably secured to the hinge pintle to rotate therewith.

The diverting valve comprises a plenum chamber 15 and an overlying gas-permeable deck 16 which, when the diverting valve is in its normal, or closed position, lies in alignment with the gas-permeable conveying deck 4 of the adjacent conveyor sections to form a continuous conveying surface for the flow of material. The gas-permeable deck 16 is of the same material as the gas-permeable deck 4.

The hinge pintle 14 is provided with an axial bore 19 and a connecting radial bore 20 which communicates with the interior of the plenum chamber 15 through a circumferentially extending slot 17'. A pressure-air pipe 21 communicates with the axial bore and supplies air under pressure which passes through the radial bore 20 into the plenum chamber 15 to pass upwardly through the gas-permeable conveying deck 16 for fluidizing overlying pulverulent material. The hinge pintle is circumferentially recessed adjacent to each end to receive packing 22 and 22' to make a gas-tight fit between the hinge pintle and the journal sleeves 14$^a$ and 14$^b$.

The hinge pintle is positioned somewhat below the gas-permeable conveying deck 16 and slightly forwardly of the downstream end of the diverting section. The gas-permeable deck 16 extends beyond the hinge pintle and has its downstream end secured to a transversely-extending batten 23 by machine screws 24. A spacing strip 25 is interposed between the sleeve 17 and the undersurface of the deck 16 where it passes over the hinge pintle. The deck 16 is secured to the hinge pintle by machine screws 26 which extend through the deck and the spacing strip and are screwed into the sleeve 17. The section 28 of the gas-permeable conveying deck 16 between the batten 23 and the spacing strip 25 provides continuity of the conveying surface when the diverting valve is in its normal position. Since the material from which the gas-permeable deck 16 is made has a certain degree of flexibility, the section 28 will flex to permit the diverting valve 9 to be swung about its hinge axis to its upper or open position, as indicated in dotted lines in FIGS. 2 and 8.

The length of the section 28 of the deck 16, in the direction of the flow of material along the conveyor, is so short that it is not necessary to provide a plenum chamber under it, since the flowing material will pass over it without losing its fluidity.

The distal or upstream end of the plenum chamber 15 is formed by the vertical flange of an angle iron 29. The horizontal flange 30 of the angle iron extends in the upstream direction and forms a support for the upstream end of the gas-permeable deck. The end of the gas-permeable deck is secured to the horizontal flange 30 of the angle iron by a batten strip 31 and machine screws 32. A sealing bar 33 is secured to the upstream end of the diverting section and has a supporting member 34 bolted to its inner side. When the diverting valve is in its normal position, the horizontal flange 30 of the angle iron rests upon and is supported by the supporting member 34. The outer edge of the gas-permeable deck 16, which engages the sealing bar 33, is ground to form an air-tight seal along the sealing bar when the diverting valve 9 is in normal closed position. This edge, as well as the other edges of the gas-permeable deck, is coated with balata sizing before the gate is assembled.

Bearing plates 34' are secured to the inside of the side walls of the diverting section adjacent to the downstream end of the latter. These bearing plates have forwardly-extending sections 35. The side edges of the gas-permeable deck make an air-tight seal with the bearing plates 34' and their extensions 35 when the diverting valve is in its normal position. Sealing plates 36 extend forwardly and upwardly from the bearing plates 34' at each side of the diverting section.

When it is desired to divert material flowing downwardly along the conveying surface 4 of the conveyor into the vertical offtake 7, the diverting valve 9 is swung about its pivotal axis to the position shown in dotted lines in FIG. 2. In this position, the side edges of the gas-permeable conveying deck 16 bear against sealing plates 36 and make a gas-tight fit therewith. Thus, the edges of the gas-permeable deck 16 form an air-tight seal with the sides of the diverting section both when in its normal conveying position and when in its open or diverting position.

When material flowing along the conveyor spills over the edge of the sealing bars 33 into the offtake conduit 8, a certain amount of it will lodge upon the upper edge of the supporting member 34. The material which remains on the upper edge will be inclined upwardly and rearwardly at the angle of repose of the material. If the outer edge of the flange 30 of the angle bar 29 were perpendicular, there would be a tendency to pack the material remaining on the upper edge of the support 34, with a gradual building up of the packed material on the edge of the supporting member which eventually would prevent the upper edge of the deck 16 of the diverting valve from lying in the horizontal plane of the upper surfaces of the conveying surfaces of the adjacent conveyor section. To avoid this, the outer end of the angle bar is rounded, as indicated at 37, to have an angle substantially equal to the angle of repose of the material. Thus, any material remaining on the top of supporting member which is packed will have an upper surface inclined at an angle substantially equal to the angle of repose of the material, and once material has been packed in the corner 38, fresh material falling onto the upper inclined surface of the packed material will slide off of it and there will be no further accumulations which would prevent the deck 16 from being lowered to the plane of the conveying surfaces of the adjacent conveyor sections.

The handle 18 for operating the diverting valve 9 may be operated manually, but preferably is operated by remote control means, such as a remotely-controlled fluid cylinder 37. The upper end of the fluid cylinder, which in this instance is its base, is bolted to the upper end of a supporting bar 38 bolted to one of the side walls of the diverting section 8. The lower end of the supporting bar 38 surrounds the hinge pintle 14 and sleeve 13 and forms additional bearing support for them. As is conventional in fluid-actuating cylinders, the cylinder carries a piston 37' in the inside thereof to which the inner end of a piston rod 39 is attached; the lower end of the piston rod carries a shackle 39' which has a pivotal connection 40 with the handle 18. A conduit 41 is connected to the base of the cylinder and supplies fluid thereto to force the piston therein and the piston rod downwardly to swing the handle 18 downwardly and concomitantly swing the diverting valve 9 to its closed position. A conduit 42 is connected to the lower end of the fluid cylinder 37 and supplies fluid thereto to force the piston upwardly or towards the base of the cylinder when it is desired to swing the handle upwardly to raise the diverting valve from its closed position to its open position. The passage of fluid through the conduits 41 and 42 to the fluid cylinder 37 is controlled by solenoid-actuated valves 43 and 44, respectively. Exhaust pipes 41' and 42' (FIG. 10) are provided for the exhaust of fluid from the ends of the cylinder 37, as hereinafter described. A lever 45 is rigidly secured to the end of the hinge pintle 14 opposite that to which the actuating handle 18 is secured. Adjustable switch actuators 46 and 47 are attached to the outer end of the lever 45 and are adapted to cooperate, respectively, with microswitches 48 and 49 of conventional form. Instead of providing the lever 45, the switch actuators could be mounted on the handle 18 and the microswitches properly located to be actuated by them as the handle moves to its extreme positions.

Assuming the diverting valve to be in its normally closed position, with the handle 18 and the lever 45 in their lower positions, and with the control switch 52 in its full line position (FIG. 10), and it is desired to divert material flowing along the conveyor into the offtake conduit 7, the control switch 52 will be swung to its upper, dotted-line position to energize the solenoid of solenoid-actuated valve 44 in the supply line 42 and the solenoid of solenoid-actuated valve 53 in the exhaust line 41'. The energization of the solenoids of the solenoid-actuated valves 44 and 53 will cause those valves to be opened to permit the flow of pressure fluid through the supply conduit 42 into the fluid cylinder 37 beneath the piston 37' and the exhaust of pressure fluid above the piston through the exhaust conduit 41'. At this time, the solenoid-actuated valve 43 in the supply line 41 and the solenoid-actuated valve 54 in the exhaust conduit 41' are closed. The flow of fluid into the bottom of cylinder 37 forces the piston 37' therein upwardly, which in turn swings the handle 18 upwardly to swing the diverting valve 9 to its upper or open position, shown in dotted lines in FIG. 2, to permit material flowing along the conveyor to be diverted into the offtake conduit 7.

The lever 45, being fixed to the hinge pintle 14, will also swing upwardly when the handle is forced upwardly by the fluid cylinder 37. When the handle 18 reaches its uppermost position, the lever 45 also will have been swung to its uppermost position and the switch actuator 46 carried thereby will have depressed the plunger 50 of microswitch 48 and opened that switch, cutting off the supply of current to the solenoids of valves 44 and 53, causing those valves to close so that the piston is locked in its upper position, shown in dotted lines in FIG. 10.

When it is again desired to close the diverting valve so that fluid may flow over the gas-permeable deck 16, the control switch 52 is swung back to the full line position shown in FIG. 10 to energize the solenoid of solenoid-actuated valve 43 in the supply line 41 and the solenoid of solenoid-actuated valve 54 in the exhaust line 42'. The energization of the solenoids of solenoid-actuated valves 43 and 54 will cause those valves to be opened to permit the flow of pressure fluid through the supply line 41 into the fluid cylinder 37 above the piston 37' and the exhaust of pressure fluid from beneath the piston through the exhaust line 42'. At this time, the solenoid-actuated valve 44 in the supply conduit 42 and the solenoid-actuated valve 53 in the exhaust conduit 41 are closed. The flow of fluid into the top of the cylinder 37 forces the piston 37' therein downwardly, which in turn moves the handle 18 downwardly to swing the diverting valve 9 to its normal, closed position, shown in full lines in FIG. 2. This brings the conveying deck 16 of the diverting valve into planar alignment with the conveying deck of the adjacent sections of the conveyor so that the deck 16 forms a part of a continuous conveying surface in the conveyor.

When the handle 18 reaches its lowermost position, the lever 45 also will have been swung to its lowermost position and the switch actuator 47 will have depressed the plunger 51 of microswitch 49, opening that switch and cutting off the supply of current to the solenoids of solenoid-actuated valves 43 and 54, causing those valves to close and locking the piston 37' in its lower position, shown in full lines in FIG. 10.

The handle 18 carries a chain-retained locking pin 55. As the handle 18 swings from its lower to its upper position, and vice versa, it moves across a bar 56 attached to a side wall of the diverting valve section. The bar 56 has upper and lower openings 57 and 58. When the handle is swung to the extreme of its upper or lower position the pin 55 will be brought into alignment with the respective openings 57 and 58 and may be inserted into those openings to mechanically lock the handle in its upper or lower position and concomitantly lock the diverting valve 9 in its closed or open position.

In the form of the invention shown in FIGS. 11, 12 and 13, no means are shown for operating the handle 18' by remote control, and it is operated solely by manually shifting it from its lower to its upper position and vice versa.

Means are provided for locking the handle in both its upper and lower positions and concomitantly to lock the diverting valve in its open and closed positions. In order to maintain the handle locked when it is swung to its lower position, a link 70 is pivoted at 71 to a spacing member 71' extending from the side wall of the diverter section 8'. Adjacent to its lower end, the link 70 carries at the side thereof adjacent to the wall of the diverting section a roller 72 eccentrically mounted on a bolt 73 carried by the link 70. After the diverting valve 9' initially has been swung to its tightly closed position, with the handle 18' swung to its extreme lower position, the eccentric roller is adjusted so that its lower surface will lie against the upper surface of the handle when the link 70 is in its dead center position, shown in FIG. 9. The bolt 73 is then tightened to maintain the eccentric roller in that position. When the link 70 subsequently is swung to its dead center position the engagement of the eccentric roller 72 with the upper surface of the handle 18' will prevent raising of the handle, and consequently, will maintain the diverting valve in its closed position.

Mounted below the handle 18' is an angled link 75 having end sections 75ᵃ and 75ᵇ. This link is spaced from the side wall of the diverter housing by a spacer 76 and the link bears against the outer face of the spacer and is pivoted thereto at 77. The end 75ᵃ of the link carries a weight 78 which normally tends to swing the link 75 to a position in which the center of the weight lies directly below the pivot axis 77. The end 75ᵇ of the link carries a roller 78 mounted eccentrically on a bolt 79. When the handle 18' is raised to its upper position the weight 78 swings the link 75 clockwise until the center of the weight lies directly beneath the pivot pin 77, at which time the end 75ᵇ of the link carrying the eccentric roller 78 extends upwardly and to the right of the dead center position, and substantially at right angles to the handle. As in the case of the eccentric roller 72, when the handle 18' initially is swung to its extreme upper position, at which position the diverting valve will be in its fully open position, the eccentric roller 78 is adjusted so that its upper surface will bear against the lower surface of the handle. The bolt 79 is then tightened to maintain the eccentric roller in that position. Thereafter, whenever the handle is swung to its extreme upper position, the end 75ᵇ of the link carrying the eccentric roller 78 will be swung clockwise until the end 75ᵇ lies substantially perpendicular to the handle. With the end 75ᵇ thus in a dead center position, it will effectively hold the handle 18' in its extreme upper position and lock the diverting valve 9' in its extreme open position.

After the handle 18' has been locked either in its lower position by link 70 and eccentric roller 72, or in its upper position by the end 75ᵇ and the eccentric roller 78, it may be released for swinging to its other position merely by manually swinging the link 70 or the link 75 from its locking position.

The other parts shown in FIGS. 11, 12 and 13 are the same as the corresponding parts shown in the preceding figures, and are designated, where shown in these figures, by the same reference characters primed.

It is to be understood that various changes may be made in the details of construction of the diverting valve mechanism disclosed and described herein without departing from the invention or sacrificing any of the advantages thereof. The scope of the invention is defined in the subjoined claims.

I claim:
1. A fluidizing gravity conveyor for pulverulent material comprising a pair of conveyor sections each including a gas-permeable conveying deck and a plenum chamber underlying said gas-permeable deck from which a gas is adapted to be passed upwardly through said gas-permeable deck, and a diverting section interposed between said pair of conveying sections and having its ends connected to the respective adjacent ends of said pair of conveyor sections, said diverting section comprising a hinge pintle extending transversely of the direction of flow of material through said section, means for turning said hinge pintle about its axis, a diverting valve mounted on said hinge pintle to swing therewith as said hinge pintle is turned, said diverting valve including an upper gas-permeable convey- ing deck and an underlying plenum chamber for receiving gas under pressure to pass upwardly through said gas-permeable deck into overlying material to fluidize it, said hinge pintle having a bore, one end of said bore communicating with the plenum chamber of said diverting valve and the other end thereof being adapted for connection to a source of gas under pressure, whereby gas may be supplied to the plenum chamber of the diverting valve through the bore of said pintle, and means for limiting the swinging movement of said diverting valve towards its closed position to position the gas-permeable deck thereof substantially in planar alignment with the gas-permeable decks of the adjacent conveying sections, said diverting section having an opening in its lower side through which material flowing along said conveyor may be diverted when said diverting valve is in its open position.

2. A fluidizing gravity conveyor as set forth in claim 1 in which a portion of said bore extends axially of the hinge pintle and another portion extends from said axial portion in a generally radial direction to communicate with the plenum chamber of the diverting valve.

3. A fluidizing gravity conveyor for pulverulent material comprising a pair of conveyor sections each including a gas-permeable conveying deck and a plenum chamber underlying said gas-permeable deck from which a gas is adapted to be passed upwardly through said gas-permeable deck, and a diverting section interposed between said pair of conveying sections and having its ends connected to the respective adjacent ends of said pair of conveyor sections, said diverting section comprising a hinge pintle extending transversely of the direction of flow of material through said section, means for turning said hinge pintle about its axis, a diverting valve mounted on said hinge pintle to swing therewith as said hinge pintle is turned, said diverting valve including an upper gas-permeable conveying deck and an underlying plenum chamber for receiving gas under pressure to pass upwardly through said gas-permeable deck into overlying material to fluidize it, said hinge pintle being spaced upstream from the downstream end of the diverting section, a flexible member bridging the space between the downstream end of the diverting section and the downstream end of the diverting valve, and means for limiting the swinging movement of said diverting valve towards its closed position to position the gas-permeable deck thereof substantially in planar alignment with the gas-permeable decks of the adjacent conveying sections, said diverting section having an opening in its lower side through which material flowing along said conveyor may be diverted when said diverting valve is in its open position.

4. A fluidizing gravity conveyor for pulverulent material comprising a pair of conveyor sections each including a gas-permeable conveying deck and a plenum chamber underlying said gas-permeable deck from which a gas is adapted to be passed upwardly through said gas-permeable deck, and a diverting section interposed between said pair of conveying sections and having its ends connected to the respective adjacent ends of said pair of conveyor sections, said diverting section comprising a hinge pintle extending transversely of the direction of flow of material through said section, means for turning said hinge pintle about it axis, a diverting valve mounted on said hinge pintle to swing therewith as said hinge pintle is turned, said diverting valve including an upper gas-permeable conveying deck and an underlying plenum chamber for receiving gas under pressure to pass upwardly through said gas-permeable deck into overlying material to fluidize it and a supporting member positioned to be engaged by the distal end portion of the diverting valve for limiting the swinging movement of said diverting valve towards its closed position to position the gas-permeable deck thereof substantially in planar alignment with the gas-permeable decks of the adjacent conveying sections, the portion of the diverting valve which overlies said supporting member when the diverting valve is in its closed position being inclined upwardly and forwardly in the direction of the flow of material through the conveyor, said diverting section having an opening in its lower side through which material flowing along said conveyor may be diverted when said diverting valve is in its open position.

5. A fluidizing gravity conveyor for pulverulent material comprising a pair of conveyor sections each including a gas-permeable conveying deck and a plenum chamber underlying said gas-permeable deck from which a gas is adapted to be passed upwardly through said gas-permeable deck, and a diverting section interposed between said pair of conveying sections and having its ends connected to the respective adjacent ends of said pair of conveying sections, said diverting section comprising a hinge pintle extending transversely of the direction of flow of material through said section, a handle non-rotatably connected to said hinge pintle for turning it about its axis, an operating member connected to said handle and mounted for reciprocal movement, remotely-controlled means for causing reciprocation of said operating means, said remotely-controlled means comprising a fluid cylinder, a piston in said cylinder and connected to said operating member and conduit means having remotely-controlled valves for selectively supplying fluid to opposite sides of said piston to cause reciprocation thereof in said cylinder, means operable by said handle as it approaches the end of its swinging movement in either direction to close the valve in the conduit supplying fluid to the cylinder, a diverting valve mounted on said hinge pintle to swing therewith as said hinge pintle is turned, said diverting valve including an upper gas-permeable conveying deck and an underlying plenum chamber for receiving gas under pressure to pass upwardly through said gas-permeable deck into overlying material to fluidize it and means for limiting the swinging movement of said diverting valve towards its closed position to position the gas-permeable deck thereof substantially in planar alignment with the gas-permeable decks of the adjacent conveying sections, said diverting section having an opening in its lower side through which material flowing along said conveyor may be diverted when said diverting valve is in its open position.

6. A fluidizing gravity conveyor as set forth in claim 5 which includes conduit means for exhausting fluid from the sides of the cylinder opposite that to which the fluid is supplied, remotely-controlled valves in said exhaust conduit means, means for simultaneously opening the valve means in the conduit for supplying fluid to one side of said cylinder and the valve means in the conduit for exhausting fluid from the opposite side of the cylinder, and in which the means operable by the handle to close the valve in the conduit supplying fluid to the cylinder at one side of the piston simultaneously closes the valve in the conduit for exhausting fluid from the cylinder at the opposite side of the piston, whereby said piston and the handle connected thereto are held against movement.

7. A fluidizing gravity conveyor as set forth in claim 6 in which said remotely-controlled valves are solenoid actuated and the means for actuating the solenoids of such valves to close the valves when the handle approaches the end of its swinging movement are switches, and which includes actuators for said switches mounted on a lever non-rotatably connected to said hinge pintle.

8. A fluidizing gravity conveyor for pulverulent material comprising a pair of conveyor sections each including a gas-permeable conveying deck and a plenum chamber underlying said gas-permeable deck from which a gas is adapted to be passed upwardly through said gas-permeable deck, and a diverting section interposed between said pair of conveying sections and having its ends connected to the respective adjacent ends of said pair of conveyor sections, said diverting section comprising a hinge pintle extending transversely of the direction of flow of material through said section, means for turning said hinge pintle about its axis, said means including a handle non-rotatably connected to said hinge pintle and movable to upper and lower positions, respectively, means for holding the handle in its lower position, said holding means comprising a link pivoted above said handle and having a part which engages an upper surface portion of said handle when said link is hanging in its dead center position, a diverting valve mounted on said hinge pintle to swing therewith as said hinge pintle is turned, said diverting valve including an upper gas-permeable conveying deck and an underlying plenum chamber for receiving gas under pressure to pass upwardly through said gas-permeable deck into overlying material to fluidize it and means for limiting the swinging movement of said diverting valve towards its closed position to position the gas-permeable deck thereof substantially in planar alignment with the gas-permeable decks of the adjacent conveying sections, said diverting section having an opening in its lower side through which material flowing along said conveyor may be diverted when said diverting valve is in its open position.

9. A fluidizing gravity conveyor as set forth in claim 8 in which the part of the link which engages an upper surface portion of the handle when the link is hanging in its dead center position is an adjustable roller member and eccentric means for mounting said roller member on said handle, whereby said roller may be adjusted about said eccentric mounting means to cause its lower portion to engage said upper surface portion of said handle when said handle is in its lowermost position.

10. A fluidizing gravity conveyor for pulverulent material comprising a pair of conveyor sections each including a gas-permeable conveying deck and a plenum chamber underlying said gas-permeable deck from which a gas is adapted to be passed upwardly through said gas-permeable deck, and a diverting section interposed between said pair of conveying sections and having its ends connected to the respective adjacent ends of said pair of conveyor sections, said diverting section comprising a hinge pintle extending transversely of the direction of flow of material through said section, means for turning said hinge pintle about its axis, said means including a handle non-rotatably connected to said hinge pintle and movable to upper and lower positions, respectively, means for holding the handle in its said upper position, said holding means comprising an angled link pivoted at an intermediate portion thereof to the diverting section, one end of said link having sufficient weight to cause that end of the link, when unrestrained, to extend vertically downwardly from the pivot, the other end of the link being at such angle to said first-mentioned end that when said first-mentioned end is extending vertically downwardly from its pivot, said second-mentioned end extends substantially normal to said handle, said second-mentioned end having a portion which engages an undersurface of said handle when said handle has been swung to its uppermost position, a diverting valve mounted on said hinge pintle to swing therewith as said hinge pintle is turned, said diverting valve including an upper gas-permeable conveying deck and an underlying plenum chamber for receiving gas under pressure to pass upwardly through said gas-permeable deck into overlying material to fluidize it and means for limiting the swinging movement of said diverting valve towards its closed position to position the gas-permeable deck thereof substantially in planar alignment wiht the gas-permeable decks of the adjacent conveying sections, said diverting section having an opening in its lower side through which material flowing along said conveyor may be diverted when said diverting valve is in its open position.

11. A fluidizing gravity conveyor as set forth in claim 10 in which the part of the angled link which engages an undersurface portion of the handle when the handle is in its uppermost position is an adjustable roller member and means for eccentrically mounting said roller member on said link, whereby said roller may be adjusted about said eccentric mounting means to cause its upper portion to engage said undersurface portion of said handle when said handle is in its uppermost position.

12. A diverting section for interposing between adjacent sections of a fluidizing gravity conveyor, which adjacent sections include a gas-permeable conveying deck and a plenum chamber underlying said gas-permeable deck from which a gas is adapted to be passed upwardly through said gas-permeable deck to fluidize overlying pulverulent material, said diverting section comprising a hinge pintle extending transversely of the direction of flow of material through said section, means for turning said hinge pintle about its axis, a diverting valve mounted on said hinge pintle to swing therewith as said hinge pintle is turned, said diverting valve including an upper gas-permeable conveying deck and an underlying plenum chamber for receiving a gas under pressure to pass upwardly through said gas-permeable deck into overlying pulverulent material to fluidize it, said hinge pintle having a bore, one end of said bore communicating with the plenum chamber of said diverting valve and the other end thereof being adapted for connecting to a source of gas under pressure, whereby gas may be supplied to the plenum chamber of the diverting valve through the bore of said pintle, and means for limiting the swinging movement of said diverting valve towards its closed position to position said gas-permeable deck at a predetermined position, said diverting section having an opening in its lower side through which material may pass when said diverting valve is in its opened position.

13. A diverting section for interposing between adjacent sections of a fluidizing gravity conveyor, which adjacent sections include a gas-permeable conveying deck and a plenum chamber underlying said gas-permeable deck from which a gas is adapted to be passed upwardly through said gas-permeable deck to fluidize overlying pulverulent material, said diverting section comprising a hinge pintle extending transversely of the direction of flow of material through said section, means for turning said hinge pintle about its axis, a diverting valve mounted on said hinge pintle to swing therewith as said hinge pintle is turned, said diverting valve including an upper gas-permeable conveying deck and an underlying plenum chamber for receiving a gas under pressure to pass upwardly through said gas-permeable deck into overlying pulverulent material to fluidize it, said hinge pintle being spaced upstream from the downstream end of the diverting valve section, a flexible member bridging the space between the downstream end of the diverting valve section and the downstream end of the diverting valve, and means for limiting the swinging movement of said diverting valve towards its closed position to position said gas-permeable deck at a predetermined position, said diverting section having an opening in its lower side through which material may pass when said diverting valve is in its open position.

14. A diverting section for interposing between adjacent sections of a fluidizing gravity conveyor, which adjacent sections include a gas-permeable conveying deck and a plenum chamber underlying said gas-permeable deck from which a gas is adapted to be passed upwardly through said gas-permeable deck to fluidize overlying pulverulent material, said diverting section comprising a hinge pintle extending transversely of the direction of flow of material through said section, means for turning said hinge pintle about its axis, said means including a handle non-rotatably connected to said hinge pintle and movable to upper and lower positions, respectively, means for holding the handle in its lower position, said holding means comprising a link pivoted above said handle and having a part which engages an upper surface portion of said handle when said link is hanging in its dead center position, a diverting valve mounted on said hinge pintle to swing therewith as said hinge pintle is turned, said diverting valve including an upper gas-permeable conveying deck and an underlying plenum chamber for receiving a gas under pressure to pass upwardly through said gas-permeable deck into overlying pulverulent material to fluidize it, and means for limiting the swinging movement of said diverting valve towards its closed position to position said gas-permeable deck at a predetermined position, said diverting section having an opening in its lower side through which material may pass when said diverting valve is in its opened position.

15. A diverting section for interposing between adjacent sections of a fluidizing gravity conveyor, which adjacent sections include a gas-permeable conveying deck and a plenum chamber underlying said gas-permeable deck from which a gas is adapted to be passed upwardly through said gas-permeable deck to fluidize overlying pulverulent material, said diverting section comprising a hinge pintle extending transversely of the direction of flow of material through said section, means for turning said hinge pintle about its axis, said means including a handle non-rotatably connected to said hinge pintle and movable to upper and lower positions, respectively, means for holding the handle in its said upper position, said holding means comprising an angles link pivoted at an intermediate portion thereof to the diverting section, one end of said link having sufficient weight to cause that end of the link, when unrestrained, to extend vertically downwardly from the pivot, the other end of the link being at such angle to said first-mentioned end that when said first-mentioned end is extending vertically downwardly from its pivot, said second-mentioned end extends substantially normal to said handle, said second-mentioned end having a portion which engages an undersurface of said handle when said handle has been swung to its uppermost position, a diverting valve mounted on said hinge pintle to swing therewith as said hinge pintle is turned, said diverting valve including an upper gas-permeable conveying deck and an underlying plenum chamber for receiving a gas under pressure to pass upwardly through said gas-permeable deck into overlying pulverulent material to fluidize it, and means for limiting the swinging movement of said diverting valve towards its closed position to position said gas-permeable deck at a predetermined position, said diverting section having an opening in its lower side through which material may pass when said diverting valve is in its opened position.

References Cited in the file of this patent
UNITED STATES PATENTS

| | | |
|---|---|---|
| 2,517,837 | Browne | Aug. 8, 1950 |
| 2,657,100 | Weller | Oct. 27, 1953 |
| 2,780,498 | Zygmuntowski | Feb. 5, 1957 |